J. R. PEIRCE.
PERFORATING MACHINE.
APPLICATION FILED OCT. 11, 1907.

998,631.

Patented July 25, 1911.
7 SHEETS—SHEET 1.

WITNESSES:
Fred White
René Bruine

INVENTOR:
John Royden Peirce,
By Attorneys,
Arthur E Fraser

J. R. PEIRCE.
PERFORATING MACHINE.
APPLICATION FILED OCT. 11, 1907.

998,631.

Patented July 25, 1911.

7 SHEETS—SHEET 4.

WITNESSES:

INVENTOR:
John Royden Peirce,
Attorneys

J. R. PEIRCE.
PERFORATING MACHINE.
APPLICATION FILED OCT. 11, 1907.

998,631.

Patented July 25, 1911.

7 SHEETS—SHEET 5.

WITNESSES:
Fred White
René Bruine

INVENTOR:
John Royden Peirce,
By Attorneys,
Arthur C. Fraser

J. R. PEIRCE.
PERFORATING MACHINE.
APPLICATION FILED OCT. 11, 1907.

998,631.

Patented July 25, 1911.
7 SHEETS—SHEET 6.

WITNESSES:
Fred White
René Bruine

INVENTOR:
John Royden Peirce,
By Attorneys,
Arthur C. Fraser

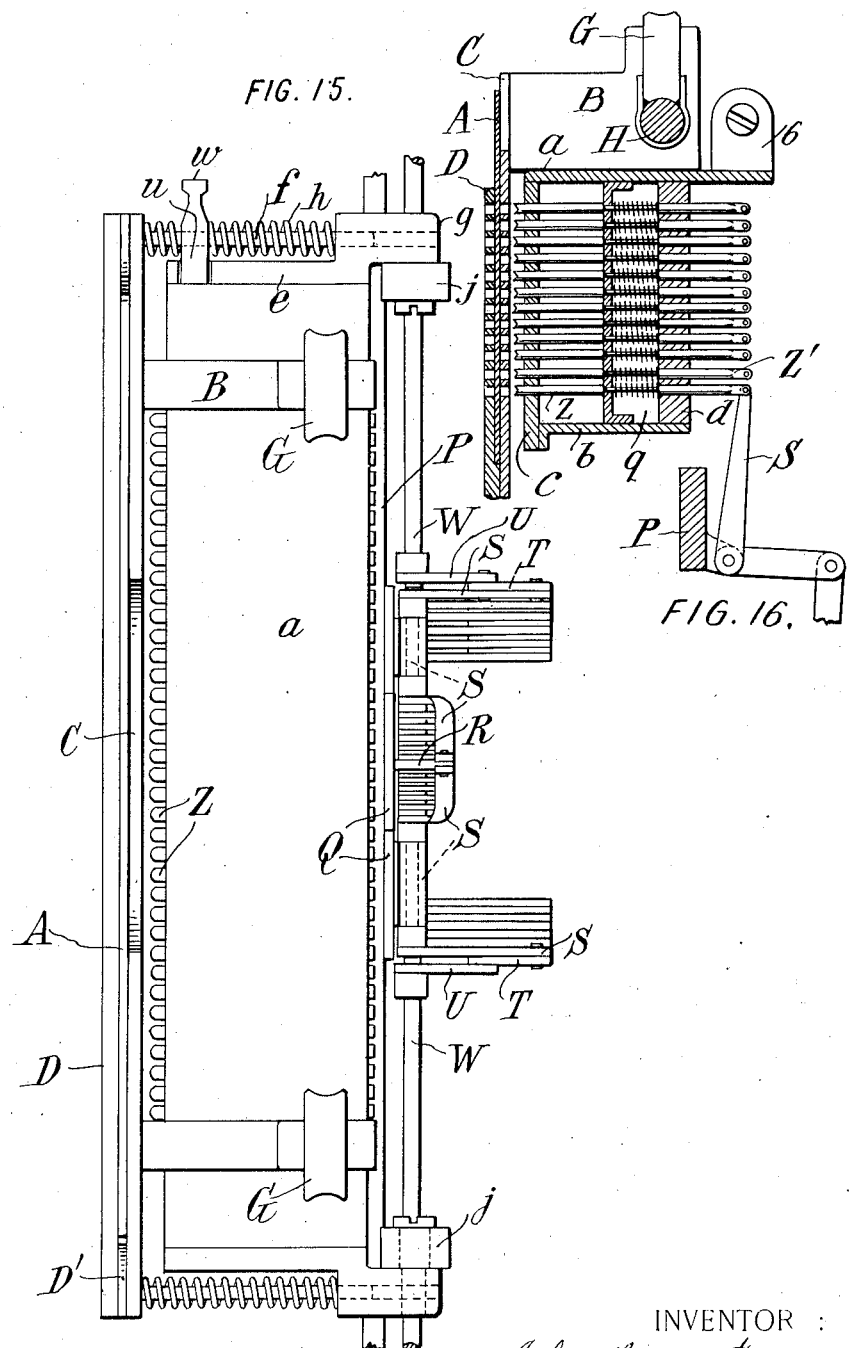

UNITED STATES PATENT OFFICE.

JOHN ROYDEN PEIRCE, OF NEW YORK, N. Y.

PERFORATING-MACHINE.

998,631.  Specification of Letters Patent.  Patented July 25, 1911.

Application filed October 11, 1907. Serial No. 396,970.

*To all whom it may concern:*

Be it known that I, JOHN ROYDEN PEIRCE, a citizen of the United States, residing in the borough of Manhattan, city, county, and State of New York, have invented certain new and useful Improvements in Perforating-Machines, of which the following is a specification.

In certain prior applications for Patents No. 321,050, filed June 9, 1906, No. 331,757, filed August 23, 1906, and No. 387,868, filed August 9, 1907, I have described a system of mechanical bookkeeping in which the ordinary statement of account is replaced by, or is accompanied by, a perforated card which constitutes a tool adapted to be used for printing quickly and without possibility of error upon a loose-leaf ledger or the like the item represented by the card. The perforations in the card adapt it for use as a controller for a printing machine, and in connection with these perforations it is preferred to print upon the card in ordinary type a statement of the item represented thereby.

The present invention consists of a machine for punching such a card or for making similar punching operations, and preferably in combination with mechanism which at the same time prints upon the card in ordinary characters the item represented by the perforations. In this one machine, therefore, and by one series of operations the card is both printed and perforated; the perforation and the printing being preferably effected by a common set of keys similar to those of the ordinary typewriter.

Various other points of improvement are referred to hereinafter.

The accompanying drawings illustrate an embodiment of the invention.

Figure 1:
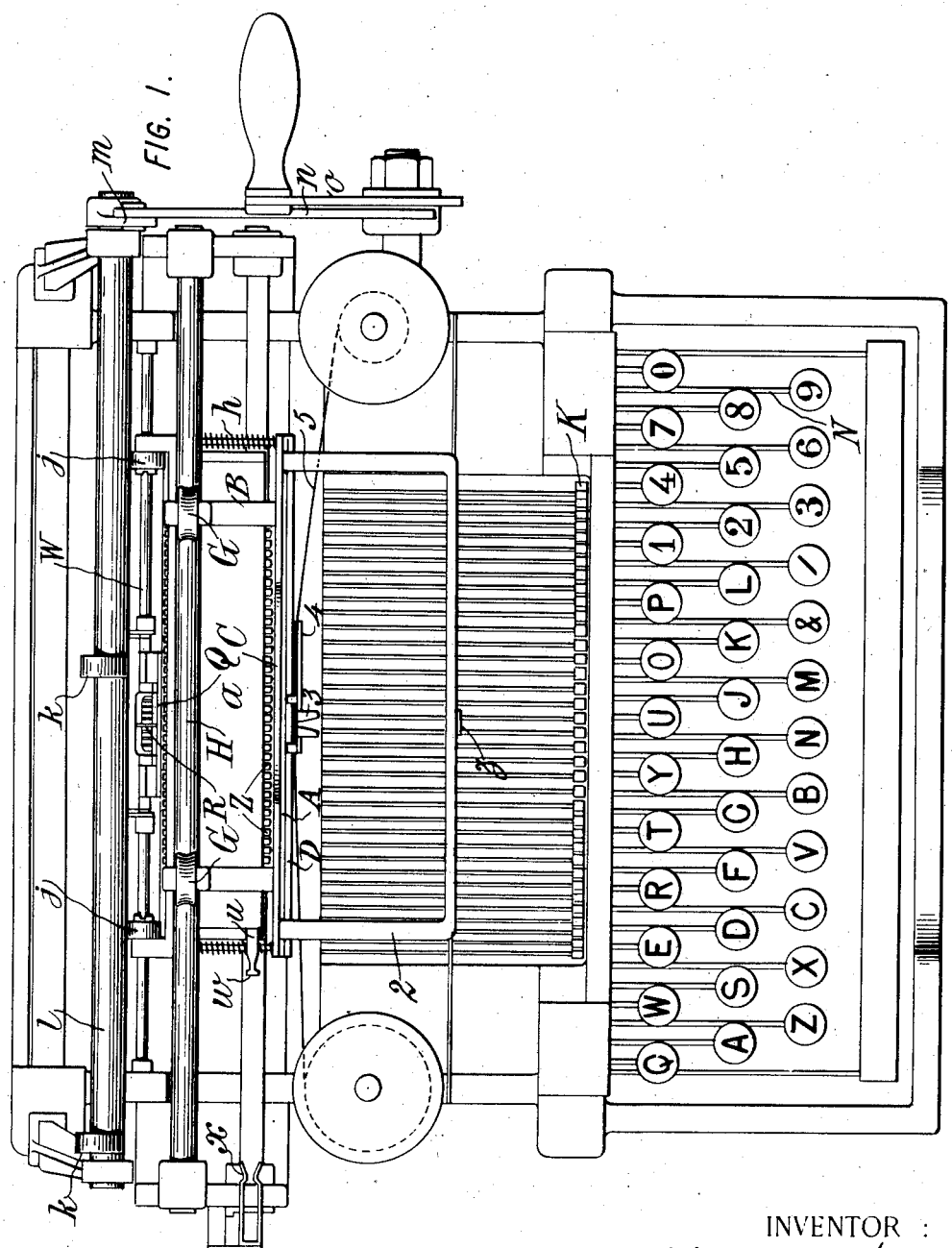
Figure 2:
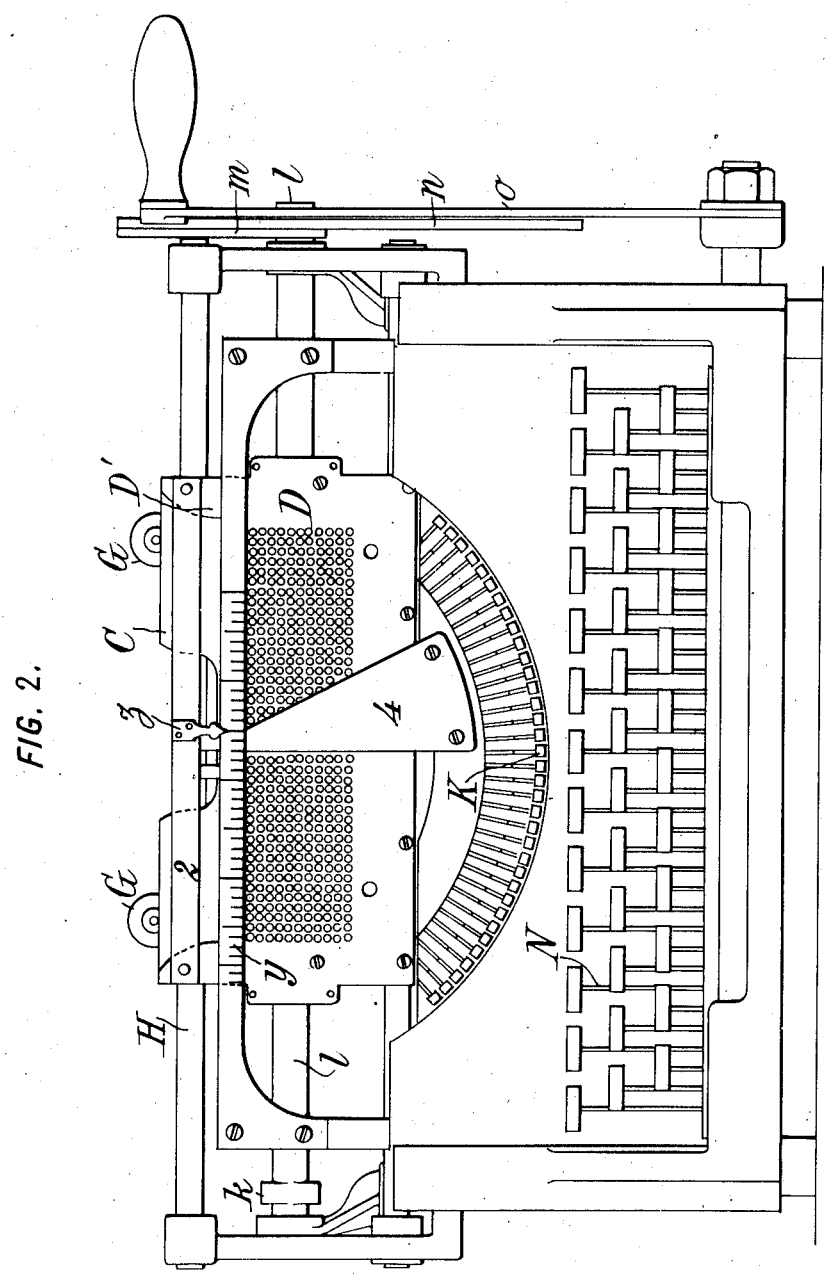
Figure 3:
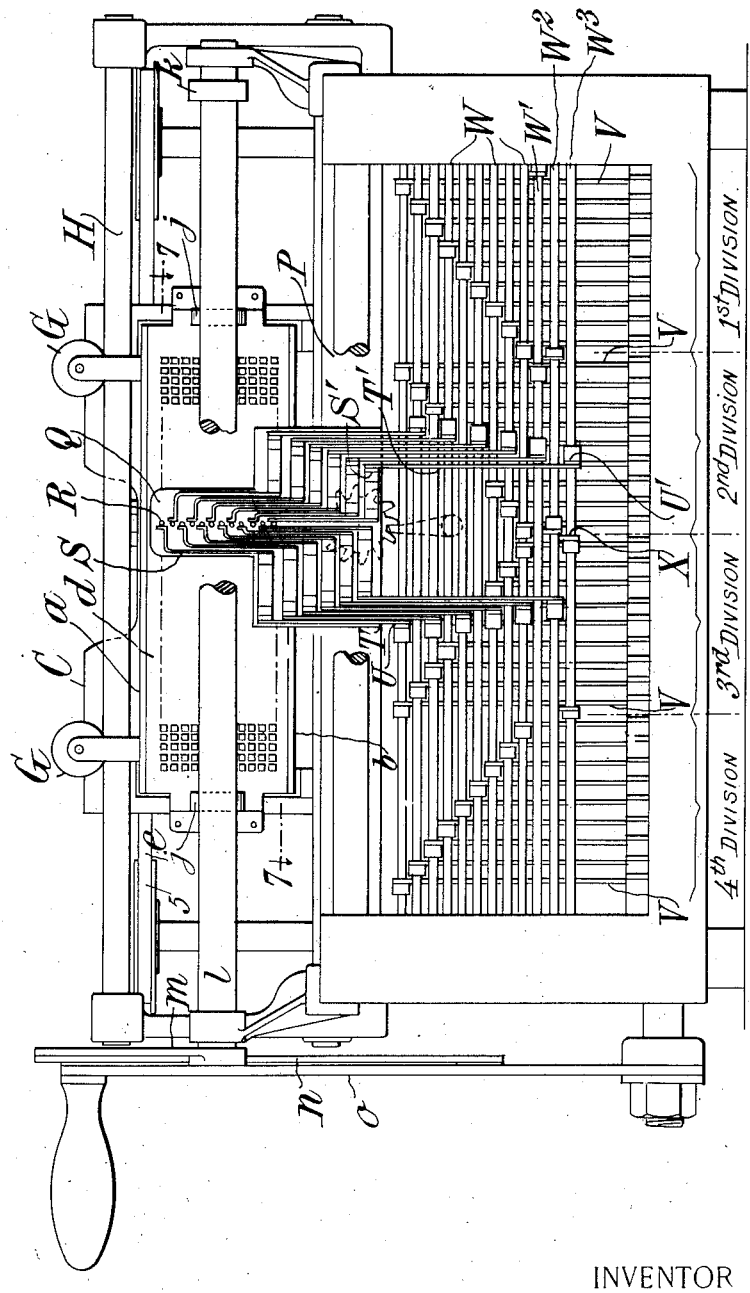
Figures 4, 10:
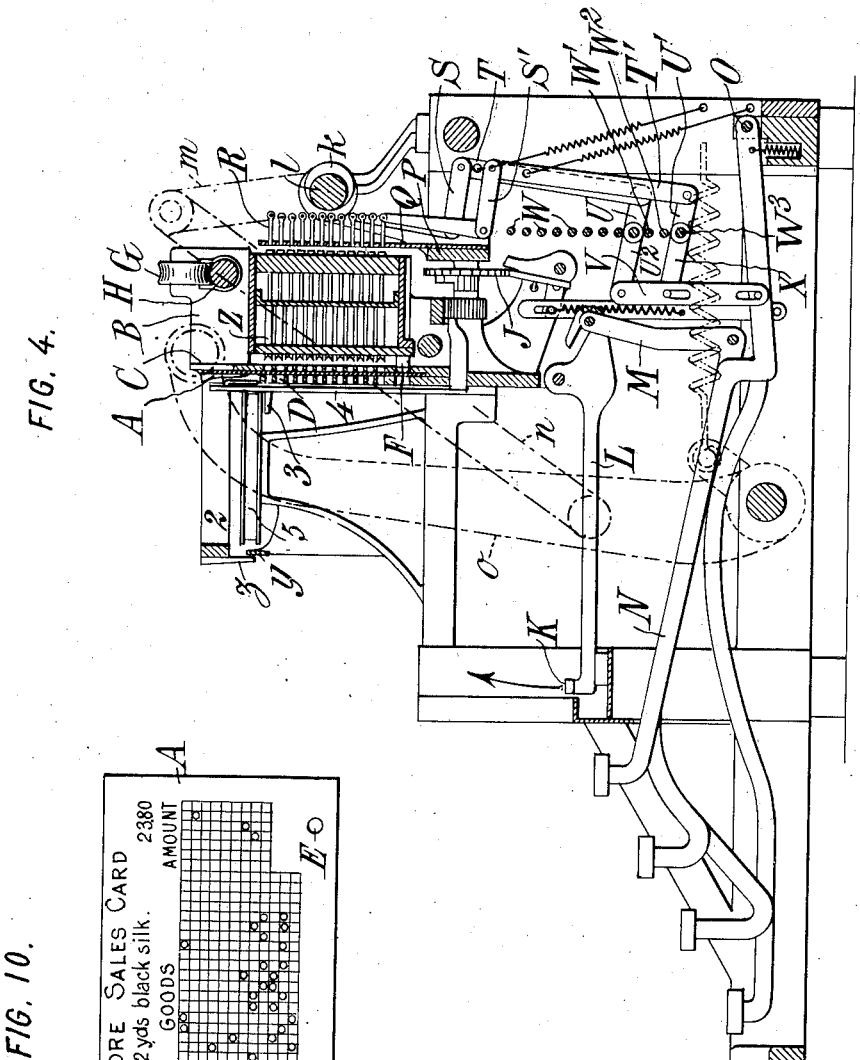
Figure 5:
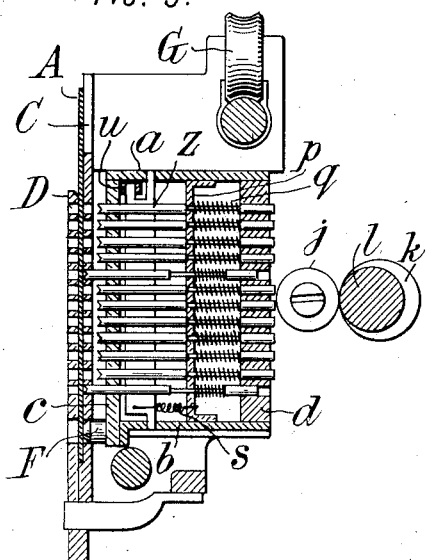
Figure 6:
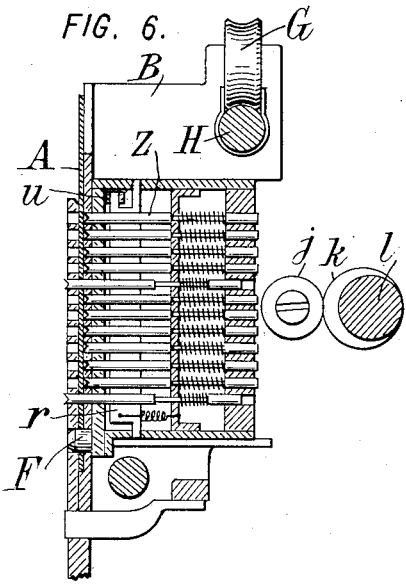
Figure 7:
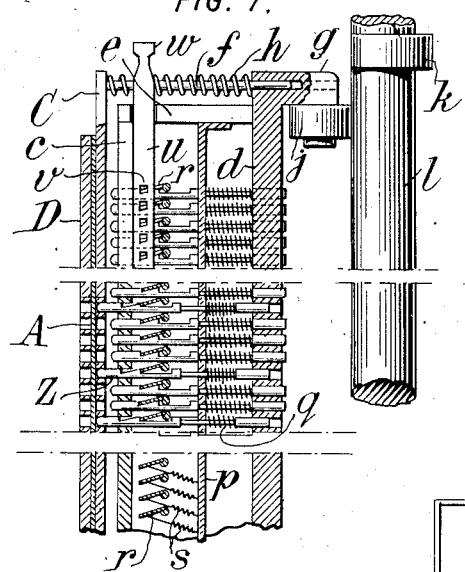
Figure 8:
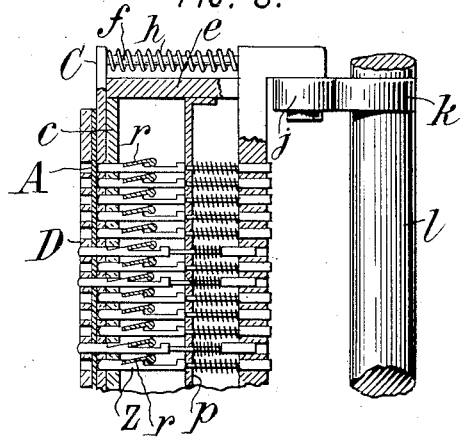
Figure 9:
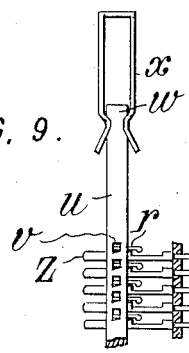
Figure 11:
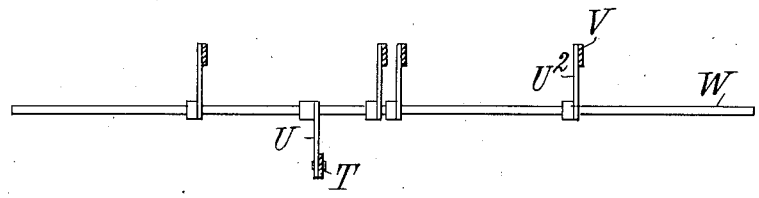
Figure 12:
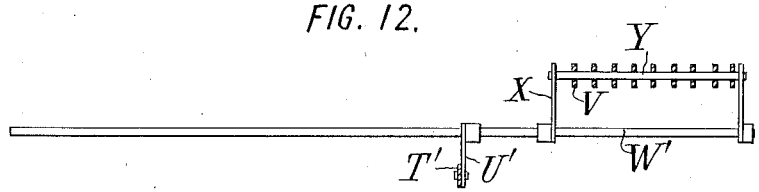
Figure 13:
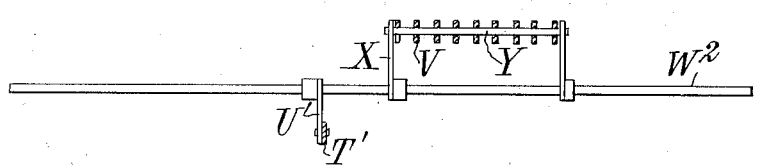
Figure 14:
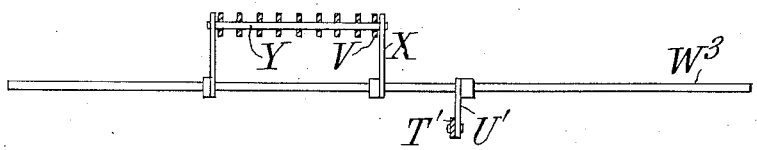

Figure 1 is a plan of the complete machine. Fig. 2 is a front elevation of the same. Fig. 3 is a rear elevation of the same partly broken away. Fig. 4 is a transverse section. Figs. 5 and 6 are vertical sections of the box of punches in successive positions of the machine. Fig. 7 is a horizontal section taken approximately on the line 7—7 of Fig. 3. Fig. 8 is a section on the same plane as the middle portion of Fig. 7, but showing punches in an advanced position. Fig. 9 is a detail of the upper part of Fig. 7, with the parts in a different position of operation. Fig. 10 is a face elevation of a style of card which may be used in the machine. Figs. 11, 12, 13 and 14 are plan views of certain shafts and connections illustrated separately for the sake of clearness. Fig. 15 is an enlarged plan view of the box carrying the punches, and of the principal parts of the punch-setting mechanism. Fig. 16 is a sectional view similar to Fig. 5, but illustrating a modification.

The card is divided (preferably by imaginary lines) into a number of adjacent columns, indicated in full lines on the drawing, each column being divided into a number of spaces depending upon the characters to be represented. Where only Arabic numerals are to be represented, nine spaces in each column will be sufficient. Where the letters of the alphabet and also the digits of the Arabic numeral system are to be represented, it is proposed to use twelve spaces in each column, as indicated. Or, by providing for various permutations, the nine digits may be indicated by as few as four spaces. The portion of the card to be perforated is divided into sections at the head of which the nature of the items represented thereby may be permanently printed. For example, we suppose the card shown to indicate a date, customer (indicated by number), goods, and amount. Various other matters may be printed upon the card, and provision may also be made for various other perforations and systems of perforations. The machine is designed not only to make the necessary perforation or perforations in each column, but also to print at the head of each section of the card the words or figures corresponding to the perforations made.

The perforating mechanism may be combined with various styles of typewriting machine, the keys being so arranged that as they print a letter or figure upon the card they actuate (either by setting in position for subsequent perforation of the card or by actually forcing the punch through the card) the perforating mechanism corresponding with it. In the mechanism of Figs. 1 to 15 the operation of the keys merely sets the proper punches in position, the entire bank of punches corresponding to all the spaces on the card being moved along with the carriage containing the card.

and being operated at the end of the printing of the line to punch the card at once with all the punches which have been set by the keys. Preferably the characters are printed upon one side of the card and the punching is effected from the opposite side. For example a machine adapted from the Underwood style of typewriter is shown in which the printing is effected upon the front of the card, and the perforating mechanism is very compactly and simply arranged at the rear.

Referring to the embodiment of the invention illustrated, the card A is carried in a pocket upon a carriage B, the rear wall of the pocket being marked C and the front wall D, and both these walls being perforated at points registering with the spaces upon the card, and being spaced apart at the ends by blocks D'. In order to insure the card's registering with the perforations in the plates C and D, any suitable centering arrangement is provided. For example, holes E are shown in the card through which tapered pins F are thrust when the machine is operated, and the effect of these tapered pins is to shift the card to the exact center if it was out of center, and to hold it so. These locating pins act of course in advance of the punches. The carriage may be provided with rollers G running upon a fixed supporting rod H. The carriage has a step-by-step movement similar to that of the ordinary typewriter, and effected, for example, by means of the usual spring and escapement J under control of each of the keys. It is advisable to delay the main movement of the escapement until the key is entirely lifted.

The front wall D of the pocket leaves exposed the portion of the card above the perforations, so that it is free to be struck by the types K which are carried upon levers L operated by means of levers M connected to key levers N which are pivoted on the shaft O at the rear of the machine. Upon a fixed bar P running across the rear of the machine is supported a vertical plate Q near the center of the machine through which passes a single row of punch-setting pins or hammers R. In the present case there are twelve of these setting pins. The first nine are connected by means of crank levers S and links T with outer arms U on shafts W, which shafts have inner arms U² connected to inner vertical links V, the lower ends of these links being connected by a pin and slot connection to key levers N. The three lower setting pins R are connected by means of similar angle levers S' and links T' with outer arms U' on shafts W' W² or W³ which have each a pair of inner arms X connected by a pin and slot connection with a certain group of the links V.

In order to understand the grouping of the connections it will be necessary to explain the system of perforations employed to represent the different characters, which we will therefore describe briefly. Where figures can be used entirely each column of the card will have nine spaces, and each figure will be connected to a separate pin R. Where a system involving a number of characters is used, however, it will be necessary to indicate the characters by a more complicated system of punching; using, for example, two punches in the same column to indicate a single character. A suitable system covering the letters of the alphabet is described in my prior application No. 331,757, above referred to. The same principle is extended in the present case to a system of characters including the alphabet and also the Arabic digits. The characters are divided into four divisions of nine each, as follows:—

| 1st Div. | 2nd Div. | 3rd Div. | 4th Div. |
|---|---|---|---|
| J | S | . | 9 |
| H | R | & | 8 |
| G | Q | Z | 7 |
| F | P | Y | 6 |
| E | O | X | 5 |
| D | N | W | 4 |
| C | M | V | 3 |
| B | L | U | 2 |
| A | K | T | 1 |

The numeral 0 does not need to be punched through the card. There is a separate key for printing it.

The first nine spaces in any column, if they are to be perforated to represent numerals, will be provided with single perforations, that is to say, a perforation in the lowest space will represent the numeral 1, in the next space the numeral 2, etc. Where a letter of the alphabet is to be represented, spaces below the first nine are utilized. The lowest three spaces of any column then serve to indicate whether the character represented is in the first, second, or third of the above divisions. If the uppermost of these three supplementary spaces is punched, a character in the first division is indicated; if the second space is punched a character in the second division; and if the third space, a letter in the third division. For example, in Fig. 4 the connections are shown to the lowermost punch-setting pin, indicating a character in the third division; and to the ninth space from the top indicating the lowermost character in this division. The operation of the key of this mechanism would therefore punch the card to represent the letter T.

The levers U and U' for operating the main punch-setting pins are arranged upon twelve shafts W extending longitudinally. Each one of the main punches R belongs to each of the four divisions above referred to.

For example, the uppermost pin R must be operated when the characters "J," "S," ".", and "9" are called for. Consequently the uppermost shaft W is connected by means of the four links V marked in Fig. 3 with corresponding keys. The corresponding link T extending upwardly from the corresponding lever U to the uppermost punch-setting pin R is also indicated in this figure. The uppermost shaft W' of the lowest three (supplementary) shafts is provided with arms X carrying between their ends a pin Y which passes through slots in the several levers V corresponding to the first division; and with a single outer arm U' transmitting its oscillation to the outer link T'. The second supplementary shaft W² is connected with the inner depending links V of the second division by a similar arrangement, and the lowermost shaft W³ to the inner links of the third division by a similar arrangement. The lowermost of the main shafts W with its inner arms connecting with the inner vertical links V, and its single outer arm U connecting with the outer vertical link T; and the several supplementary shafts W' W² and W³, will be understood more clearly from the plan views, Figs. 11, 12, 13 and 14.

The vertical row of punch-setting pins R is stationary at approximately the center of the machine, as previously explained, and the bank of punches is moved past it step-by-step to bring the columns successively in line with the setting pins. The punches Z are carried in a box having top and bottom walls $a$ $b$, and front and rear walls $c$ $d$ respectively. The carriage in which the box is carried consists of two end members $e$ forming the opposite ends of the punch-box. The plate C extends above the punch-carrying box at its two ends, as shown in Fig. 3, being cut away at the center to form a finger space for convenience in inserting the card. The plate C also extends slightly beyond each end of the box, as shown in Fig. 7, and is provided with guide pins $f$ entering extensions $g$ of the rear plate $d$ of the box, and carrying springs $h$ tending to press the box out. Each of the extensions $g$ carries a roller $j$ adapted, when the carriage has moved to the end of its stroke, to lie opposite a cam $k$ of which there are two carried upon the shaft $l$ extending longitudinally in the rear of the setting pins. The shaft $l$ is provided with an arm $m$ which is connected by a link $n$ with the hand-lever $o$ at the right of the machine; so that when the hand-lever is pulled forward the box carrying the punches is also pulled forward (and forces through the card such punches as have been set, in the manner hereinafter described).

The punches Z (Figs. 5, 6 and 7) are supported and guided in openings in the front and rear plates $c$ $d$ of the box. A partition $p$ is provided against which bear small spiral spring $q$ the opposite ends of which engage heads of the punches and press these heads outward in normal position, the outward movement being limited by the engagement of a suitable shoulder on each punch against the front face of the partition $p$. Each column of punches is provided with a single pawl $r$ in the form of a plate extending from top to bottom of the box and pivoted at its rear edge, and held against is row of punches by one of a series of springs $s$ fastened to the partition plate $p$. When a punch is moved forward a shoulder $t$ thereon moves under the pawl and is engaged by the end of the pawl to prevent backward movement of the punch under the influence of its spring $q$. In this position the end of the punch is approximately touching the card. When a number of punches have been set in this way to correspond with the perforations desired upon the card throughout the entire line, and the box is brought with its rollers $j$ opposite the cams $k$, then the hand-lever is operated to force the box forward from the position shown in Fig. 5 to that shown in Fig. 6, in which such punches as have been set in operative position are forced through the card. The return of the hand-lever allows the springs $h$ at the ends of the box to force the latter back to the position of Fig. 5.

For returning the punches which have been set, back to their normal position, a slide $u$ is provided which is in engagement with projections $v$ at the upper ends of the several pawls $r$, and this slide is provided with a head $w$, which, when the carriage has reached the end of the line, enters between springs $x$ and is held thereby. Now when the carriage is returned to its starting position at the opposite side of the machine, a pull is effected upon the slide $u$ which swings the parts to the position of Fig. 9, withdrawing all the pawls $r$ and releasing all the punches Z, so that those which were set are free to return to their normal position under the influence of their springs $q$.

For determining the position of the card, a fixed scale $y$ is provided, and a pointer $z$ travels over the face of the scale, being fastened to the rear wall of the card pocket by a bracket 2. The usual guide 3 for directing the type against the paper is supported by a plate 4 running up in front of the front wall of the box, and which also carries a guide for the ribbon 5.

The columns in which the perforations are arranged in vertical rows may be replaced for many purposes by columns or sections of somewhat different shape with the perforations grouped together in various ways; and by suitable adaptation of known mechanisms the spaces may be punched in various permutations to indicate the several characters desired. For example, where only the nine digits are to be indicated, the card may be divided into squares, each square having four spaces at which perforations are made in various arrangements.

The pins F are made longer than the punches Z so as to enter the perforations E of the card and center it before the punches take effect. Various other expedients for centering the card may be used. Or, the pins F may actually punch the card so as to form the holes E in certain definite relation with the perforations formed by the punches Z, so that when the card is used in a listing or similar machine, the perforations E may be used to center it.

In the mechanism shown in Fig. 16 the operation of the keys actuates the punches not merely by setting them in operative position, but by forcing them through the card. In this arrangement the card and the pocket C D are attached to the brackets carrying the rollers G, so that they travel as previously explained. The box $a$ $b$, however, carrying the punches Z, is fixed, as indicated by means of a lug 6, to any fixed part of the machine. The principal part of each of the pins Z is the same as in the previously described construction. They are forced backward by means of springs $q$, and there are no pawls to hold them forward. Their rear ends are extended backward beyond the rear wall $d$ of the box so as to form extensions Z' connected directly to the levers S, of which all but one are omitted for the sake of clearness. The box and punches being stationary, it is only necessary that a single set or column of punches be provided. As each column of the card registers with the column of punches, the proper punch or punches are forced through the card by the operation of the key, and are withdrawn to permit the card to take the next step sidewise. The mechanism is therefore simpler than that previously described, and is preferable in most cases where the card is thin enough to be punched by the movement of the keys.

What I claim is:—

1. A perforating mechanism for perforating a card, in combination with a printing mechanism including separately movable types adapted to print on said card characters corresponding with the perforations.

2. In combination, a printing mechanism for printing characters on a card and including separately movable types, and a key for moving each type, and a perforating mechanism under control of said keys for perforating said card in a manner corresponding with the characters printed thereon.

3. In combination, a perforating mechanism, a printing mechanism, means for printing a character and simultaneously setting the perforating mechanism for a corresponding character, and separately actuated means for operating the perforating mechanism.

4. In combination, a perforating mechanism, a printing mechanism, means for printing characters and simultaneously setting the perforating mechanism for corresponding characters and advancing the work step-by-step until a line has been printed, and means for operating the perforating mechanism for an entire line at once.

5. In combination, a perforating mechanism, a printing mechanism, a card pocket in fixed relation with the punches of the perforating mechanism, and means for obtaining relative movement between said pocket and said printing mechanism.

6. In combination, a perforating mechanism for perforating a card, a printing mechanism for printing on the same card, and a card carrier which is bodily movable laterally.

7. In combination, perforating punches, printing type, a set of keys, means for transmitting motion from said keys to said punches and type respectively, and a card carrier movable bodily relatively to said transmitting means.

8. In combination, a printing mechanism, a perforating mechanism including punches and punch-setting pins, and a card pocket in fixed relation with said punches and movable relatively to the printing mechanism and the setting pins.

9. In combination, a printing mechanism including separately movable types on one side of a card, and a perforating mechanism arranged to perforate the card from the other side.

10. In combination, a printing mechanism including a key-board and arranged to carry a card in a vertical position and to print characters on the face of the card which is toward the key-board, and a punching mechanism at the opposite side of the card and controlled from said key-board.

11. A perforating mechanism including in combination punches arranged in a number of adjacent sections, a single section of punch-actuating devices, and a carriage carrying said punches and movable to bring the sections thereof successively in operative relation with said devices.

12. A perforating mechanism including in combination punches arranged in a number of adjacent sections, a single section of punch-setting devices, a carriage carrying said punches and movable to bring the sections thereof successively in operative relation with said devices, and means for operating the punches which have been set by said devices.

13. A perforating mechanism including in combination a carriage for a card to be perforated in any of a series of adjacent sections and at any of a series of points in each section, a bank of punches, one for each point in each section, and means for selecting successively the punches to be used in successive sections.

14. A perforating mechanism including in combination a carriage for a card to be perforated in any of a series of adjacent sections and at any of a series of points in each section, a bank of punches, one for each point in each section, means for selecting successively the punches to be used in successive sections, and means for operating simultaneously all the punches selected.

15. A perforating mechanism including in combination punches Z, punching-setting pins R for pushing them forward, pawls r for holding them in their forward positions, and a box carrying said punches and means for moving the same forward and backward.

16. A perforating mechanism including in combination punches Z arranged in adjacent columns, punch-setting devices R arranged in a single column, a box carrying said punches and adapted to be moved longitudinally to bring the successive columns of punches in line with the punch-setting devices, and means for giving said box a forward and backward movement.

17. A perforating mechanism including in combination punches, pawls for holding said punches in operative position, a carriage reciprocable in a direction transverse to the punching movement and carrying said punches and pawls, and means operated by the reciprocation of said carriage for withdrawing said pawls.

18. A perforating mechanism including in combination punches Z, means for moving them forward, pawls r for holding them in their forward position, and a transversely movable slide u for withdrawing said pawls.

19. A perforating mechanism including in combination a card pocket, a set of keys in front of said pocket, a series of shafts at the rear of said pocket and oscillated by said keys, and punches controlled by said shafts.

20. A perforating mechanism including in combination a carriage adapted to carry a card to successive positions, means for providing successive perforations in said card, and a pin F adapted to pass through or to form centering holes in the card before the card is punched by the other mechanism and to hold the same in fixed position in said carriage.

21. A perforating mechanism including in combination a series of punches Z, a card pocket movable to carry a card to successive positions, and a pin F tapered on the end and extending beyond the punches Z and adapted to pass through the card in advance of the punches Z so as to center the same and hold it in fixed position in the pocket before the punches act.

In witness whereof, I have hereunto signed my name in the presence of two subscribing witnesses.

JOHN ROYDEN PEIRCE.

Witnesses:
   Domingo A. Usina,
   Fred White.